No. 613,268. Patented Nov. 1, 1898.
A. T. HAGEN & D. M. COOPER.
COLLAR PRESSING MACHINE.
(Application filed Jan. 22, 1898.)
(No Model.) 2 Sheets—Sheet 1.
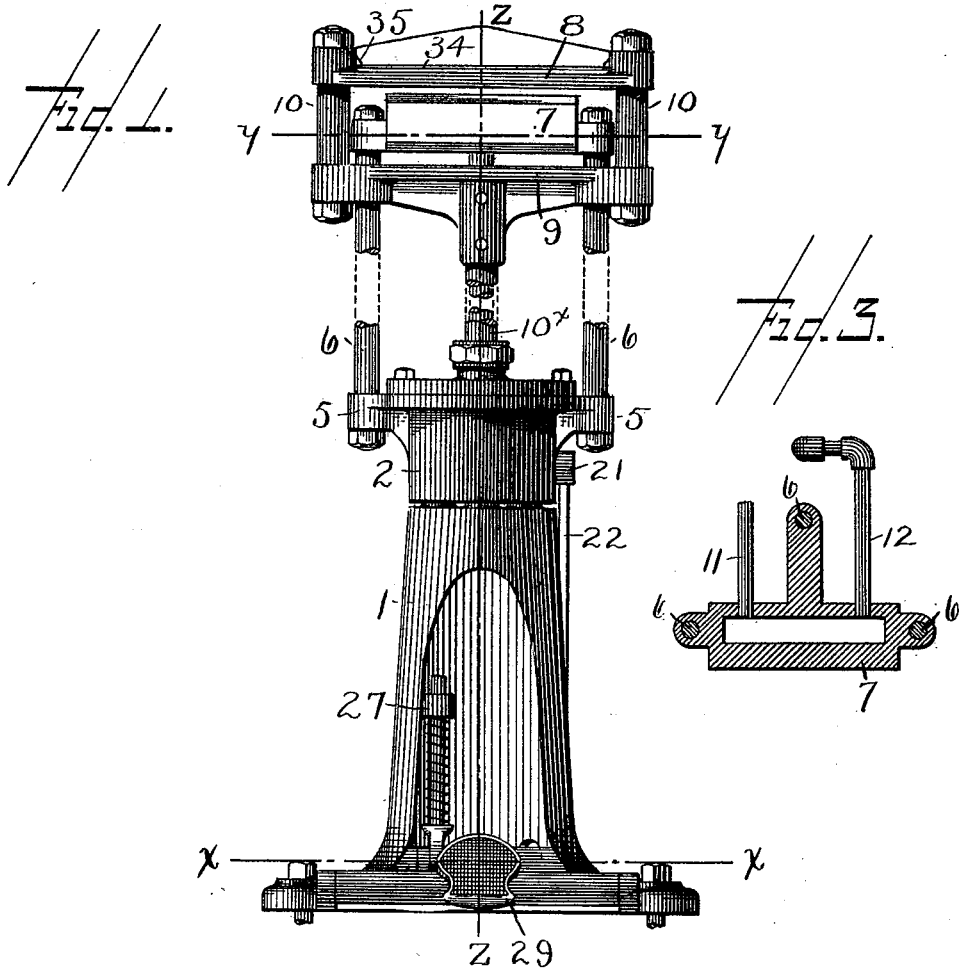
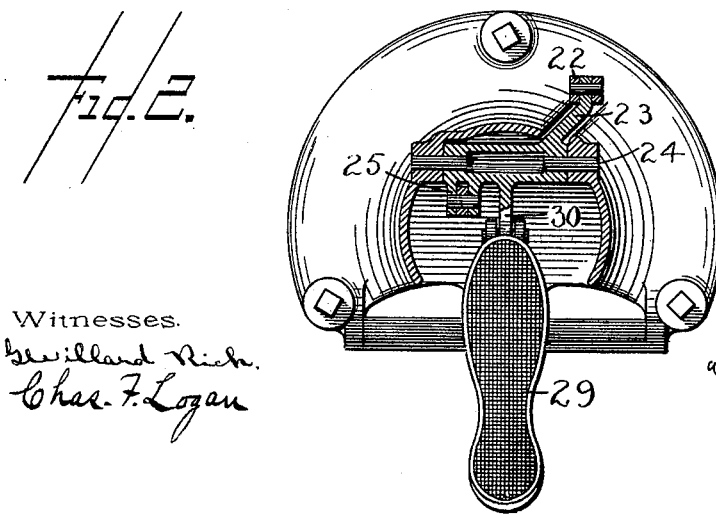
Witnesses.
Inventors
Arthur T. Hagen
Daniel M. Cooper
Church & Church
their Attorneys
THE NORRIS PETERS CO., PHOTO-LITHO., WASHINGTON, D. C.

No. 613,268. Patented Nov. 1, 1898.
A. T. HAGEN & D. M. COOPER.
COLLAR PRESSING MACHINE.
(Application filed Jan. 22, 1898.)
(No Model.) 2 Sheets—Sheet 2.
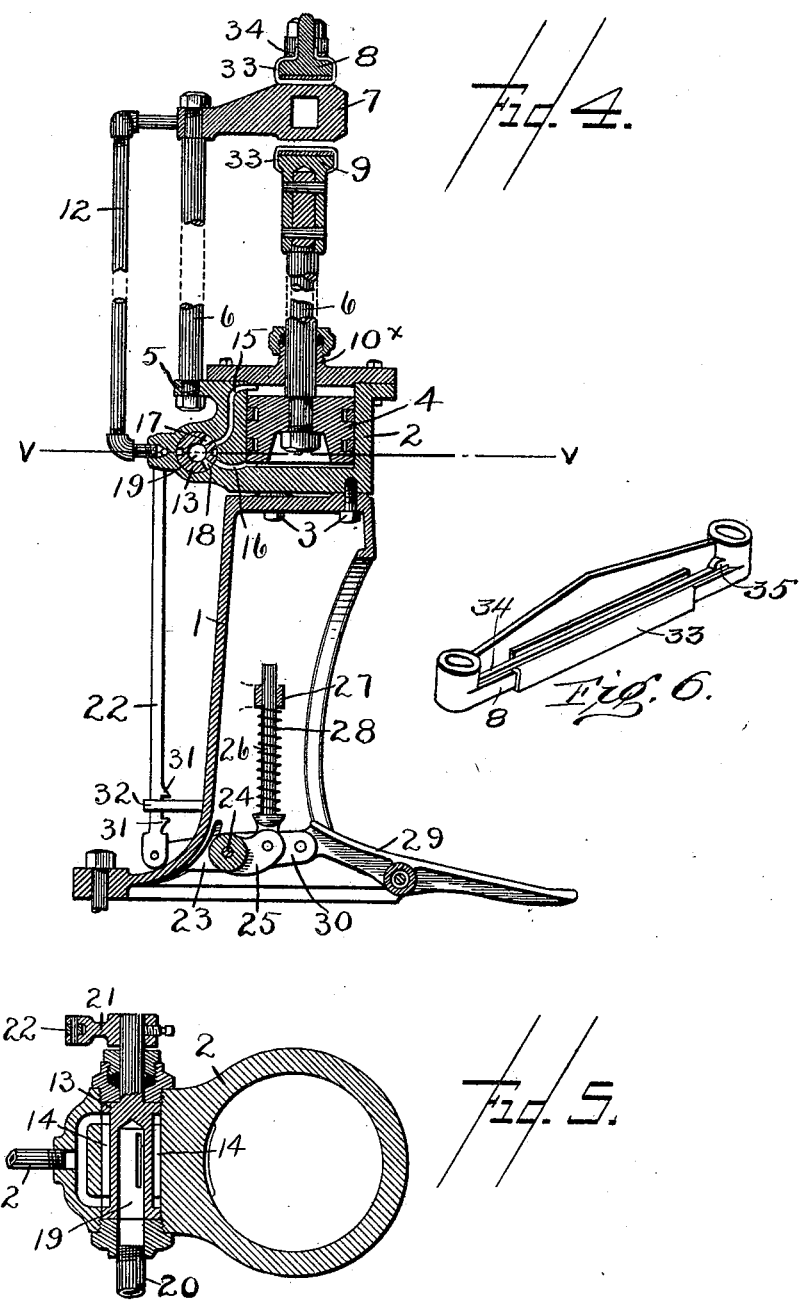
Witnesses.
Inventors

UNITED STATES PATENT OFFICE.

ARTHUR T. HAGEN AND DANIEL M. COOPER, OF ROCHESTER, NEW YORK.

COLLAR-PRESSING MACHINE.

SPECIFICATION forming part of Letters Patent No. 613,268, dated November 1, 1898.

Application filed January 22, 1898. Serial No. 667,613. (No model.)

*To all whom it may concern:*

Be it known that we, ARTHUR T. HAGEN and DANIEL M. COOPER, of Rochester, in the county of Monroe and State of New York, have invented certain new and useful Improvements in Collar-Pressing Machines; and we do hereby declare the following to be a full, clear, and exact description of the same, reference being had to the accompanying drawings, forming a part of this specification, and to the reference-numerals marked thereon.

Our present invention has for its object to provide a machine for smoothing and pressing flat the outwardly-projecting faces of the turned-over tips or points of collars, whereby the seam at the edges of said points, and which is practically a continuation of the seam at the upper edge of the collar, is caused to project at the rear of the tips instead of on the face thereof, and the faces of the points are rendered smooth and even; and to this end it consists in certain improvements hereinafter described, the novel features being pointed out particularly in the claims at the end of this specification.

In the drawings, Figure 1 is a front elevation of a machine embodying our improvements; Fig. 2, a cross-sectional view on the line $x\ x$ of Fig. 1; Fig. 3, a cross-sectional view taken on the line $y\ y$ of Fig. 1; Fig. 4, a vertical sectional view taken on the line $z\ z$ of Fig. 1; Fig. 5, a cross-sectional view taken on the line $v\ v$ of Fig. 4; and Fig. 6, a perspective view of the upper part of the machine, showing the manner of attaching the covering to the platen.

Similar reference-numerals in the several figures indicate similar parts.

The present embodiment of our machine consists of a base or stand 1, to which is secured a frame or casting 2 by means of bolts 3 or otherwise, said frame 2 having a cylinder formed in it, within which operates a piston-head 4, carrying the operating parts of the machine. The frame 2 is provided on opposite sides and at the rear with ears 5, to which are connected standards 6, carrying at their upper ends a hollow steam-heated platen 7, secured by nuts, as shown, or otherwise. The upper and lower surfaces of this platen are smooth and are adapted to coöperate with movable padded surfaces or platens 8 and 9, arranged above and below the heated platen and adapted to be moved relatively and alternately into contact with it. The platens 8 and 9 are preferably connected by rods or bolts 10 and separated a greater distance apart than the thickness of the heated platen 7, and the lower platen 9 is mounted directly upon the upper end of the piston-rod $10^{\times}$, connected to the piston 4, and is provided with apertures for the free passage of the stationary standards 6 at the sides. Live steam for heating the platen 7 is admitted through a supply-pipe 11 at one end of the rear slide and is exhausted through a pipe 12, connecting with a steam-chest or valve-chamber in the frame 2, from whence it is admitted above or below the piston by means of a valve 13 to cause the vertical movements of the padded platens 8 and 9.

The valve 13 may be of any suitable description that will admit steam on one side of the piston-head and permit the exhaust on the other; but we prefer to employ a rotary valve having the inlet-port 14 arranged at one side in normal communication with the steam-supply and adapted to coöperate with the ports or passages 15 and 16, leading to the ends of the cylinder. The valve shown also has the exhaust-ports 17 and 18 on opposite sides of port 14, communicating with the central chamber 19 of the valve, which is connected with the exhaust-pipe 20. As a means for conveniently operating this rotary valve, we attach to the stem thereof an arm 21, connected by a link or pitman 22 with an arm 23 on a rock-shaft 24 pivoted in the base. This rock-shaft is also provided with an arm 25, connected to a rod 26, having a shoulder between which and a stationary lug 27 on the base is arranged a spring 28, tending to move the shaft in a direction to turn the valve and admit steam below the piston and force the padded platens upward, leaving the top of the face of the platen 7 free, as this enables the operator to start work on the upper heated surface, which is desirable. 29 indicates a treadle pivoted to the base and also to an arm 30 on the rock-shaft 24, by means of which the operator may actuate the valve and control the direction of movement of the piston. The rod or pitman 22 is provided with stop-shoulders 31, which coöperate with a lug 32 on the base and prevent excessive movement of the valve.

The felt or cloth constituting the padding on the platens 8 and 9 may be secured in any suitable manner; but we prefer to extend the covering 33 over the edges of the platens and to hold the edges of said covering by placing upon them removable strips 34 of spring metal, the ends of which latter are passed beneath lugs or ears 35 on the outer sides of the ends of the platens, so that the tendency of the springs to resume their normal (bowed) shape will hold them in position and also secure the covering, the arrangement being shown particularly in Figs. 1 and 4.

The manner of using the device will now be understood.

When collars having turn-over points are received from any collar-ironer which irons the goods by a single passage through it, the seams at the edges of the tips project on the front side, and the operator standing at the front of the machine, with his foot on the treadle, picks up a collar and inserts the corner or tip on top of the heated platen with the face of tip in contact therewith, then reverses the valve, bringing down the upper padded platen and squeezing the tip tightly, smoothing the face and forcing the seam to the rear of the tip when turned. While the tip of the collar is still held by the platens, the operator bends the collar around and inserts the tip at the other end thereof beneath the heated platen, then reverses the valve by means of the treadle, causing the upward movement of the connected padded platens and releasing the tip held by the upper one.

By means of this machine the operator is enabled to accomplish the work very rapidly, as two collars may be operated upon at each movement of the platens and the operation carried on continuously, one surface of the heated platen being always ready for the application of a collar-tip.

It is desirable that the surfaces of the heated platen be kept very hot and also that the pressure exerted between the platens be considerable, and this is best accomplished by connecting the supply of live steam directly to the heated platen and connecting the exhaust from the latter directly to the valve or steam-chest supplying the cylinder.

The third standard 6 at the rear of the heated platen is for the purpose of preventing the said platen from tipping; but, if desired, this could be dispensed with if the side standards are made heavy enough.

While it is desirable that the centrally-arranged heated platen should be formed of a cored casting, as shown, its principal feature is to provide two smooth heated surfaces for the coöperation of the padded platens, and the details of construction could be varied without departing from the spirit of our invention.

We claim as our invention—

1. In a pressing-machine for operating on collar-tips, the combination with the heated platen, of the padded platens on opposite sides thereof, and means for moving said platens relatively to cause the coöperation of the padded platens with opposite sides of the heated platen.

2. The combination with the heated platen, of the padded platens on opposite sides thereof connected for simultaneous operation, means for causing the successive coöperation of the heated and padded platens.

3. The combination with the heated platen, of the padded platens arranged on opposite sides thereof, a steam-operated piston for causing the alternate engagement of the padded platens with the heated platen, and a reversing-valve for controlling the operation of the piston.

4. In a pressing-machine, the combination with two oppositely-arranged heated ironing-surfaces, of padded platens coöperating with the heated surfaces, and movable relatively into contact with them alternately, of a steam-cylinder, a piston therein for causing the relative movements of the platens, and a controlling-valve for governing the admission of steam to the cylinder, substantially as described.

5. In a pressing-machine, the combination with the hollow metal platen, and a padded platen for coöperating therewith, of a cylinder, a piston operating therein for causing the relative movements of the platens, a valve-chest, a valve for controlling the piston, a steam-supply pipe connected with the hollow platen, a pipe connecting the platen and the steam-chest, and an exhaust controlled by the valve, substantially as described.

6. In a pressing-machine, the combination with the frame and the standards thereon, the hollow platen connected rigidly to the standards, the two connected platens arranged on opposite sides of the hollow platen, and guided on the standards, of the cylinder, the piston operating therein and attached to the connected platens, and valve devices for controlling the supply and exhaust of steam to and from the ends of the cylinder, substantially as described.

7. In a pressing-machine, the combination with the oppositely-arranged heated metallic surfaces, the two padded platens coöperating therewith and connected for simultaneous operation in opposite directions relatively to the heated surfaces, of a steam-cylinder, a piston operating therein for causing the relative movement of coöperating surfaces, a valve controlling the supply and exhaust to and from the steam-cylinder, and means for causing the automatic movement of the valve in one direction so that the same coöperating surfaces are normally separated.

8. In a pressing-machine, the combination with the heated platen, and a padded platen coöperating therewith, of a steam-cylinder, a piston operating therein for causing the relative movements of the platens, a valve for controlling the supply and exhaust to the cylinder, a treadle connected to the valve, and means, such as a spring, for operating the valve to cause the separation of the platens.

9. In a pressing-machine, the combination with a heated platen, a padded platen coöperating therewith, of the steam-cylinder, the piston operating therein for causing the relative movements of the platens, the controlling-valve for the cylinder, the rock-shaft having the oppositely-arranged arms, the link connected to one arm and to the valve, the pivoted treadle connected to the other arm on the rock-shaft, and the spring for actuating the shaft in one direction.

10. In a pressing-machine, the combination with the heated platen, of the platen 8 coöperating with it, having the lugs 35 at the ends of the rear side, the felt or cover for the face of the platen extending over the sides, and the laterally-flexible elastic securing-strips bearing intermediate their ends upon the cover and having the ends extending beneath the lugs.

ARTHUR T. HAGEN.
DANIEL M. COOPER.

Witnesses:
F. F. CHURCH,
G. A. RODA.